United States Patent [19]

Bergh

[11] 4,386,822
[45] Jun. 7, 1983

[54] POLARIZER AND METHOD

[75] Inventor: Ralph A. Bergh, Palo Alto, Calif.

[73] Assignee: The Leland Stanford Junior University, Stanford, Calif.

[21] Appl. No.: 195,934

[22] Filed: Oct. 10, 1980

[51] Int. Cl.³ .............................................. G02B 5/14
[52] U.S. Cl. .............................. 350/96.15; 350/96.29
[58] Field of Search ............... 350/96.10, 96.11, 96.12, 350/96.15, 96.29, 400, 401, 96.19, 96.16; 250/227

[56] References Cited

U.S. PATENT DOCUMENTS

| | | | |
|---|---|---|---|
| 3,839,067 | 10/1974 | Sosnowski et al. | 350/96.19 X |
| 3,996,576 | 12/1976 | Bullock | 350/96.19 X |
| 4,151,747 | 5/1979 | Gottlieb et al. | 350/96.15 X |
| 4,264,126 | 4/1981 | Sheem | 350/96.15 |

*Primary Examiner*—Marvin L. Nussbaum
*Attorney, Agent, or Firm*—Knobbe, Martens, Olson & Bear

[57] ABSTRACT

Apparatus and method for changing the degree of polarization of light in a waveguide such as an optical fiber. A portion of the cladding of a strand of fiber optic material is removed, and a body of birefringent material is mounted in the area in which the material has been removed in close proximity to the core of the fiber. The birefringent material modifies the propagation of two polarization modes within the fiber in such manner that one of the modes is coupled to a bulk wave mode and removed from the guide, while the second mode excites no bulk waves and remains guided.

13 Claims, 2 Drawing Figures

POLARIZER AND METHOD

This invention pertains generally to the polarization of light and more particularly to a method and apparatus for polarizing light in a waveguide such as an optical fiber.

Heretofore, many techniques have been developed for changing the degree of polarization of light waves. However, to apply these techniques to light transmitted by a waveguide such as an optical fiber, it is necessary to divert the light from the fiber, make the desired change in polarization externally of the fiber, then return the light to the fiber.

It is in general an object of the invention to provide a new and improved polarizer and method for changing the degree of polarization of light transmitted by a waveguide such as an optical fiber.

Another object of the invention is to provide a polarizer and method of the above character in which the change in polarization is effected without diverting the light from the waveguide or fiber.

These and other objects are achieved in accordance with one presently preferred embodiment of the invention by positioning a body of birefringent material in proximity to the core portion of an optical fiber. The relative indices of refraction of the fiber and the birefringent material are such that the wave velocity of light of one polarization mode is greater in the fiber than in the birefringent material and the wave velocity of light of a second polarization mode is greater in the birefringent material than in the fiber. Light of the first polarization mode is coupled from the fiber to the birefringent material, whereas the light of the second polarization mode remains guided by the core portion of the fiber.

Figure 1:
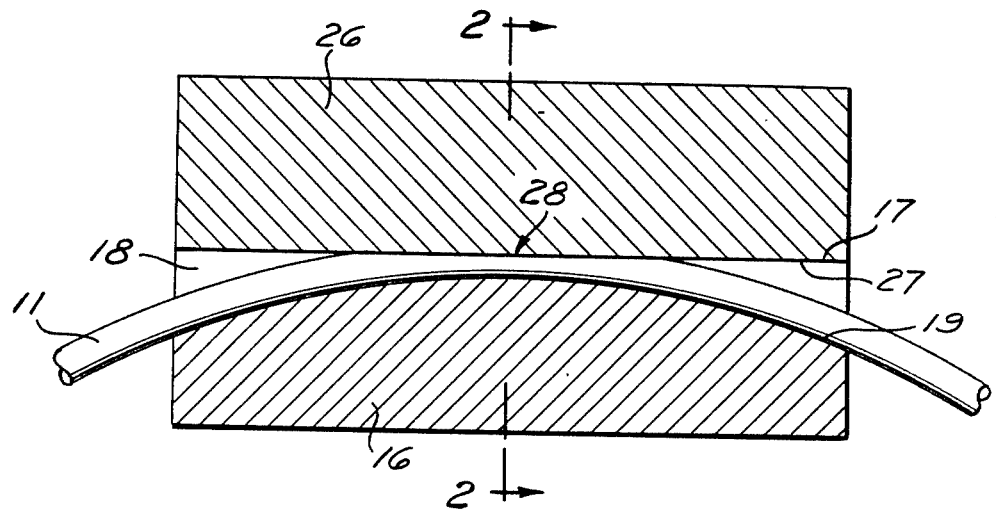
FIG. 1 is a center line sectional view, somewhat schematic, of one embodiment of a polarizer according to the invention.
Figure 2:
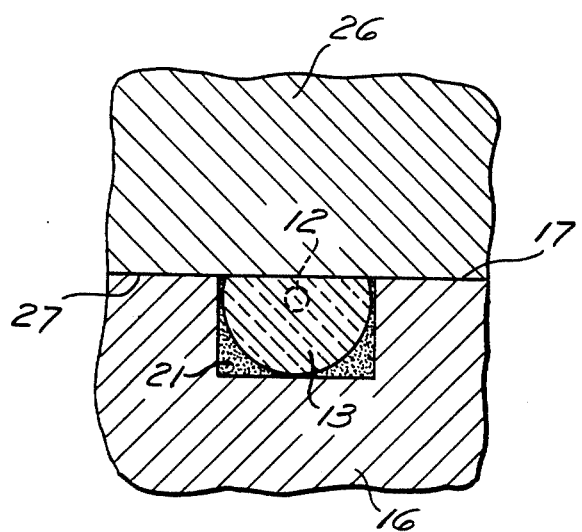
FIG. 2 is an enlarged fragmentary cross-sectional view, somewhat schematic, taken along line 2—2 of FIG. 1.

In the embodiment illustrated, the polarizer includes a strand 11 of single mode fiber optic material. This strand comprises a single fiber of quartz glass which is doped to have a central core portion 12 and an outer cladding portion 13. For single mode operation, the core typically has a diameter on the order of 1–10 microns, and the cladding has a diameter on the order of 100 microns. In FIG. 1, the diameter of the strand is exaggerated for clarity of illustration, and in FIG. 2, the diameter of the core is likewise exaggerated. While this particular embodiment employs a single mode fiber having a step gradient, the invention is not limited to such fibers and can be employed advantageously with other fibers, e.g. graded index single and multimode fibers.

Strand 11 is affixed to a base or block 11 having an optically flat face or surface 17. The strand is mounted in a slot 18 which opens through face or surface 17 and has an arcuately curved bottom or inner wall 19. The primary function of the base 16 is to hold the strand 11, and the base 16 can be fabricated of any suitable rigid material. In one presently preferred embodiment, the base 16 comprises a generally rectangular block of fused quartz approximately 1 inch long, 1 inch wide and ⅜ inch thick. In this embodiment, the fiber optic strand 11 is secured in the slot by suitable cement 21 such as epoxy glue. If desired, however, the block can be fabricated of any other suitable material, such as silicon, and the strand 11 can be secured in the slot by any suitable means.

In the schematic illustration of the drawings, bottom wall 19 is illustrated as being flat in cross-section. However, this wall can be curved or have any other desired cross-section.

Toward the center of the block 16, the depth of slot 18 is less than the diameter of strand 11, and the outer portion of the cladding 13 fiber optic strand 11 is removed evenly with surface 17. At the edges of the block 16, the depth of the slot 18 is preferably at least as great as the diameter of the strand 11 so that none of the cladding 13 is removed at these points. Thus, the amount of fiber optic material removed increases gradually from zero toward the edges of the block to a maximum near the center of the block.

A crystal 26 of birefringent material is mounted on block 16 in close proximity to core 12 in the region in which the cladding material 13 is removed. The crystal has a planar surface 27 which faces block surface 17 and is positioned to partially intersect the light propagating in the fiber strand 11. In one presently preferred embodiment, the diameter of the core portion 12 is on the order of 4 microns, and the separation between the crystal 26 and the core portion is on the order of 1 micron. In this embodiment, bottom wall 19 has a radius of curvature on the order of 20 cm. and the interaction region 28 between the fiber strand 11 and the crystal 26 is on the order of one millimeter long.

The crystal 26 is positioned within the evanescent field of light transmitted by the fiber strand 11 and comprises a body of birefringent material which provides different wave velocities for light of different polarizations. With polarizations for which the wave velocity in the crystal is slower than the wave velocity in the fiber strand 11, the light carried by the fiber strand 11 excites a bulk wave in the crystal, and that light escapes from the fiber strand 11. With polarizations for which the wave velocity in the crystal 26 is greater than in the fiber, no bulk wave is excited, and the light remains guided by the fiber strand 11. Thus, by proper selection and orientation of the crystal 26 of birefringent material, light of one polarization can be retained within the fiber strand 11 while light of a second polarization is removed. Utilizing this technique, it is possible to effect a high degree of polarization within an optical fiber strand 11.

The presence of the birefrigent crystal 26 produces a slight change in the wave velocities within the fiber strand 11, more specifically a slight increase for light of one polarization and a slight decrease for light of the second polarization. However, these changes are minimal, and the relative wave velocities defined herein are based upon the assumption that the crystal 26 is present. Thus, a wave with polarization along one of the principal axes of the crystal 26 will propagate at a slower speed in the crystal 26 than in the fiber strand 11 when the crystal 26 is present, and a wave with polarization along a second axis will propagate at a greater speed in the crystal 26 than in the fiber when the crystal 26 is present.

In order to retain light of one polarization mode within the fiber strand 11 while light of a second polarization mode is radiated away, crystal 26 is chosen to have at least one refractive index which is equal to or greater than the refractive index of the core of optical fiber stand 11 and a second refractive index which is equal or less than the refractive index of the cladding 13 of the fiber strand 11. If the crystal 26 has three indices of refraction, one of these indices should be on one side of the optical fiber strand 11 index, and the other two should be on the other side. In one presently preferred embodiment, the crystal 26 has one index of refraction which is greater than the refractive index of the fiber strand 11 and two indices of refraction which are less than the fiber strand 11 index. With this relationship, the orientation of the crystal 26 can be adjusted to adjust the lossiness of one polarization without affecting the other. In the illustrated embodiment, the crystal 26 is preferably cut so that the axis of the largest index of refraction lies in the plane of surface 27 which is generally parallel to the axis of fiber 11.

In one presently preferred embodiment, the optical fiber strand 11 is fabricated of amorphous silica with an effective index of refraction of approximately 1.46, and crystal 26 comprises a potassium pentaborate ($KB_5O_8 \cdot 4H_2O$) crystal having the following refractive indices at a wavelength of 633 nm in a vacuum; $N_a=1.49$, $N_b=1.43$ and $N_c=1.42$, where a, b and c correspond to the axes of symmetry of the crystal 26. The crystal 26 is cut in a plane perpendicular to the "b" axis, and the cut surface 27 is polished and placed against the fiber strand 11 in interface region 28. For light polarized perpendicular to the crystal-fiber interface 28, the refractive index ($N_b=1.43$) of the crystal 26 is less than the refractive index (1.46) of the fiber strand 11, and this light remains within the fiber strand 11. The index of refraction N for polarization parallel to the crystal-fiber interface 28 lies between $N_c=1.42$ and $N_a=1.49$, according to the following relationship:

$$N \simeq \left[ \frac{\sin^2\theta}{N_c^2} + \frac{\cos^2\theta}{N_a^2} \right]^{-\frac{1}{2}}$$

where $\theta$ is the angle between the polarization and the "a" axis of the crystal. For an effective polarizer, the orientation and refractive index of the crystal 26 are chosen to make the slower wave velocity in the crystal 26 very close to the velocity within the fiber strand 11, it having been found that the wave is coupled to the bulk wave more efficiently as the velocity in the crystal 26 gets closer to the velocity in the fiber strand 11.

In one preferred method of assembly, fiber strand 11 is bonded into slot 18, and the fiber strand 11 and block 16 are ground and polished together. The polished face of crystal 26 is then placed against the surface of the block and fiber strand 11, and pressure is applied to reduce the separation to a fraction of a micron. Oil having an index of refraction of approximately 1.45 is inserted between the crystal 26 and fiber strand 11 by capillary action to provide optical matching between the crystal and fiber strand 11. The oil also serves to reduce friction to facilitate positioning of the crystal on the block.

Although the crystal 26 is illustrated as being of substantially the same size as block 16, the crystal 26 can be substantially smaller, e.g. a few microns thick, a few microns wide, and about 1 mm. long.

Operation and use of the polarizer and therein the method of the invention is as follows. Light transmitted by fiber strand 11 typically has two modes of polarization, one perpendicular to interface 28, the other perpendicular to this mode or parallel to this interface 28. With the crystal 26 cut and oriented as described above, the index of refraction for light polarized perpendicular to the crystal-fiber interface 28 is less than the effective index of the fiber, i.e., the wave velocity in the crystal 26 for this polarization is greater than the velocity in the fiber, and consequently at the interface 28 this light remains guided by the fiber. For light which is polarized parallel to the interface 28, the index of the crystal 26 is in the range of or greater than the effective index of the fiber, i.e., the wave velocity in the crystal 26 for this polarization is in the range of or less than the velocity in the fiber, and this light excites a bulk wave in the crystal 26 and thus escapes from the fiber. The light which remains in the fiber is thus highly polarized in the direction perpendicular to the interface 28. Polarizers constructed in accordance with the invention have provided extinction ratios (ratio of light removed from the undesired polarization mode to light retained in the undesired polarization mode) in excess of 60 dB, with a loss of the desired polarization (throughput loss) of only a few percent.

The polarizer and method of the invention have a number of important features and advantages. They permit the degree of polarization of light in an optical fiber to be adjusted or changed without diverting the light from the fiber. They are capable of relatively high extinction ratios, with relatively little throughput loss.

It is apparent from the foregoing that a new and improved polarizer and method have been provided. While only certain presently preferred embodiments have been described in detail, as will be apparent to those familiar with the art, certain changes and modifications can be made without departing from the scope of the invention as defined by the following claims.

I claim:

1. In apparatus for controlling the polarization of light: a fiber optics waveguide for transmitting light along a predetermind path, said fiber optics waveguide including a core and a cladding, and a body of birefringent material disposed in proximity to a portion of said fiber optics waveguide, the cladding of said portion having a thickness such that the evanescent field of light transmitted by said fiber optics waveguide propagates within said birefringent material, said fiber optics waveguide and said birefringent material having refractive indices such that the wave velocity of light of a first selected polarization in the birefringent material is on the order of or less than the wave velocity of light in said fiber optics waveguide and the wave velocity of light of a second selected polarization in the birefringent material is greater than the wave velocity of light in said fiber optics waveguide for coupling light of the first polarization from said fiber optics waveguide to a bulk wave mode in said birefringent material while light of the second polarization remains in said fiber optics waveguide.

2. The apparatus of claim 1 wherein the body of birefringent material comprises a birefringent crystal.

3. The apparatus of claim 2 wherein the birefringent crystal has one index of refraction greater than the refractive index of the fiber optics waveguide and two indices of refraction less than the refractive index of the fiber optics waveguide.

4. The apparatus of claim 3 wherein the crystal is cut such that the axis of the greater index of refraction lies in the plane of the cut, and the crystal is positioned such that the plane of the cut is generally parallel to the axis of the strand.

5. The apparatus of claim 1 wherein the fiber optics waveguide comprises a strand of single mode fiber optic material.

6. In a method for controlling the polarization of light in a fiber optics waveguide having a core and a cladding, the steps of: applying light to the fiber optics waveguide; removing part of the cladding from a portion of the fiber optics waveguide; and positioning a body of birefringent material in proximity to said portion of the fiber optics waveguide so that evanescent field coupling transmits light of a first predetermined polarization from the fiber optics waveguide to the birefringent material while light of a second predetermined polarization remains in the fiber optics waveguide.

7. In apparatus for controlling the polarization of light: a strand of fiber optic material having a core portion surrounded by a cladding portion for transmitting the light, a portion of said cladding portion being removed in close proximity to the core portion, and a body of birefringent material positioned in the region in which the core portion is removed, the relative wave velocities of light of different polarizations in the fiber optic material and the birefringent material being such that light of one polarization is coupled from the strand to the birefringent body and light of a second polarization remains in the strand.

8. The apparatus of claim 7 wherein the body of birefringent material comprises a birefringent crystal.

9. In a polarizer: a strand of fiber optic material having a core portion and a cladding portion, and a birefringent crystal positioned in proximity to the core portion with an index of refraction equal to or greater than the refractive index of the core portion and an index of refraction equal to or less than the refractive index of the cladding portion for coupling light of one polarization away from the core portion and retaining light of a second polarization in the core portion.

10. The polarizer of claim 9 wherein the core portion has a thickness on the order of 1–10 microns, and the crystal is spaced from the core portion by a distance on the order of 1 micron.

11. The polarizer of claim 9 wherein a portion of the cladding portion is removed and the birefringent crystal is mounted in the region in which the cladding is removed.

12. A polarizer comprising:
a base having a slot therein;
a strand of fiber optics material having a core and a cladding, a portion of said strand being mounted within said slot so that the cladding of said portion forms a surface facing outwardly from said slot, the cladding of said surface being thinner than the cladding on the remainder of said strand;
means for introducing light into said strand; and
a birefringent material placed adjacent said surface so that evanescent field coupling transfers light of a first selected polarization from the strand to said birefringent material while light of a second selected polarization remains in said strand.

13. A method for controlling the polarization of light, comprising the steps of:
forming a slot in a base;
placing a strand of fiber optics material having a core and a cladding in the slot so that a portion of the cladding projects out of the slot;
removing the portion of the cladding projecting out of the slot; and
placing a birefringent material adjacent the strand where the cladding was removed so that evanescent field coupling transfers lightwave of a first selected polarization from the fiber to the birefringent material while light of a second selected polarization remains within the fiber.

* * * * *